(12) United States Patent
Svoboda et al.

(10) Patent No.: US 11,160,998 B2
(45) Date of Patent: Nov. 2, 2021

(54) FALL ENERGY LIMITER

(71) Applicant: Honeywell International Inc., Morris Plains, NJ (US)

(72) Inventors: Radim Svoboda, Brno (CZ); Jan Hrouzek, Brno (CZ); Vaclav Hruza, Novosedly (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 140 days.

(21) Appl. No.: 16/176,672

(22) Filed: Oct. 31, 2018

(65) Prior Publication Data

US 2019/0126079 A1 May 2, 2019

Related U.S. Application Data

(60) Provisional application No. 62/579,714, filed on Oct. 31, 2017.

(51) Int. Cl.
| | | |
|---|---|---|
| *A62B 35/04* | (2006.01) |
| *A62B 35/00* | (2006.01) |
| *F16D 7/04* | (2006.01) |
| *F16D 7/06* | (2006.01) |

(52) U.S. Cl.
CPC .......... *A62B 35/04* (2013.01); *A62B 35/0093* (2013.01); *F16D 7/04* (2013.01); *F16D 7/06* (2013.01)

(58) Field of Classification Search
CPC .... A62B 1/00; A62B 1/08; A62B 1/10; A62B 35/04; A62B 35/0093; F16D 7/06; F16D 7/04

See application file for complete search history.

(56) References Cited

U.S. PATENT DOCUMENTS

| | | | |
|---|---|---|---|
| 4,176,733 A | 12/1979 | Twickler | |
| 4,618,026 A | 10/1986 | Olson | |
| 4,941,549 A * | 7/1990 | Da-Tan | A62B 1/10 182/234 |
| 5,186,289 A * | 2/1993 | Wolner | A62B 1/12 182/232 |
| 6,810,997 B2 * | 11/2004 | Schreiber | A62B 1/10 182/233 |
| 7,155,773 B2 * | 1/2007 | Haeussermann | F16D 7/10 15/390 |
| 7,210,645 B2 * | 5/2007 | Paterson | A62B 35/0093 242/383.4 |
| 8,272,476 B2 * | 9/2012 | Hartman | A62B 1/08 182/5 |
| 8,567,561 B2 * | 10/2013 | Strasser | A62B 1/10 182/234 |
| 9,222,521 B2 * | 12/2015 | Nias | F16D 1/0835 |
| 9,488,235 B2 * | 11/2016 | Casebolt | A62B 35/0093 |
| 10,065,053 B2 * | 9/2018 | Verstegen | A62B 1/18 |
| 10,556,138 B2 * | 2/2020 | Fegley | A62B 1/10 |
| 10,744,354 B2 * | 8/2020 | Choate | A62B 35/0093 |
| 2010/0236867 A1 | 9/2010 | Jones et al. | |
| 2017/0045092 A1 * | 2/2017 | Otozai | F16D 7/06 |

* cited by examiner

*Primary Examiner* — Colleen M Chavchavadze
(74) *Attorney, Agent, or Firm* — Alston & Bird LLP

(57) ABSTRACT

A self-retracting lifeline including a housing, a drum mounted for rotation in the housing, a lifeline wrapped around the drum and extending from the housing, and a rotary energy absorber unit including at least one mount adapted for selective rotation in the housing, and an energy absorber adapted to absorb energy in response to the mount rotating relative to the housing.

9 Claims, 15 Drawing Sheets

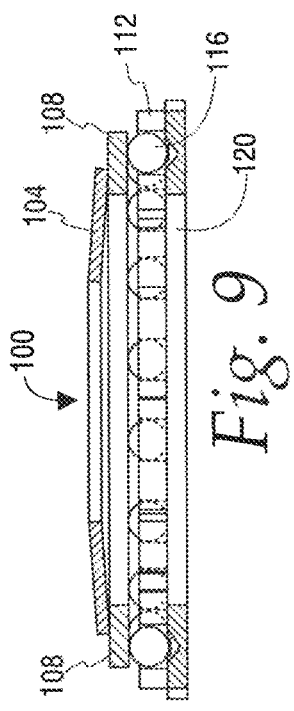
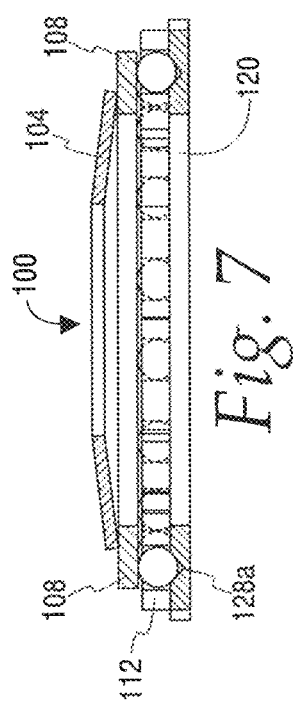
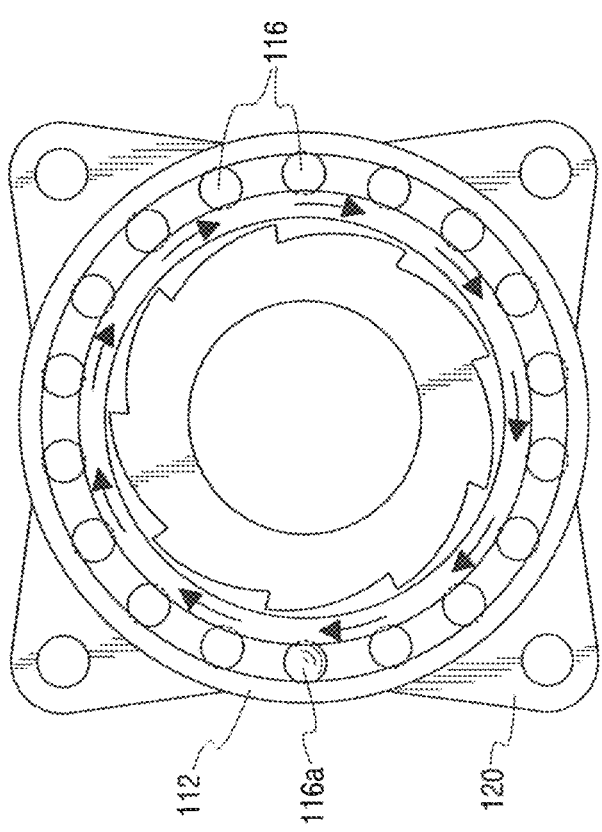
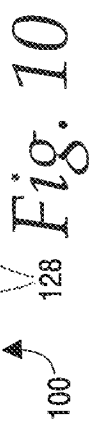

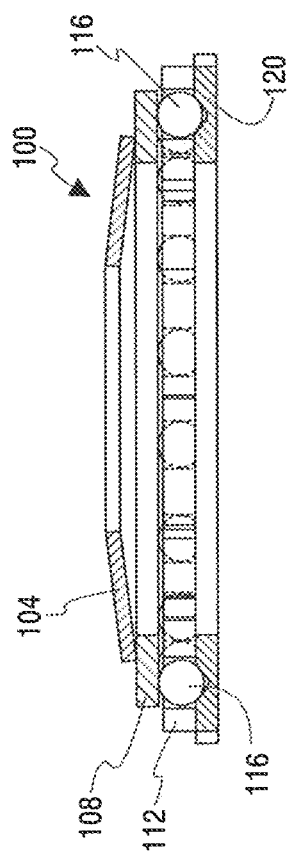
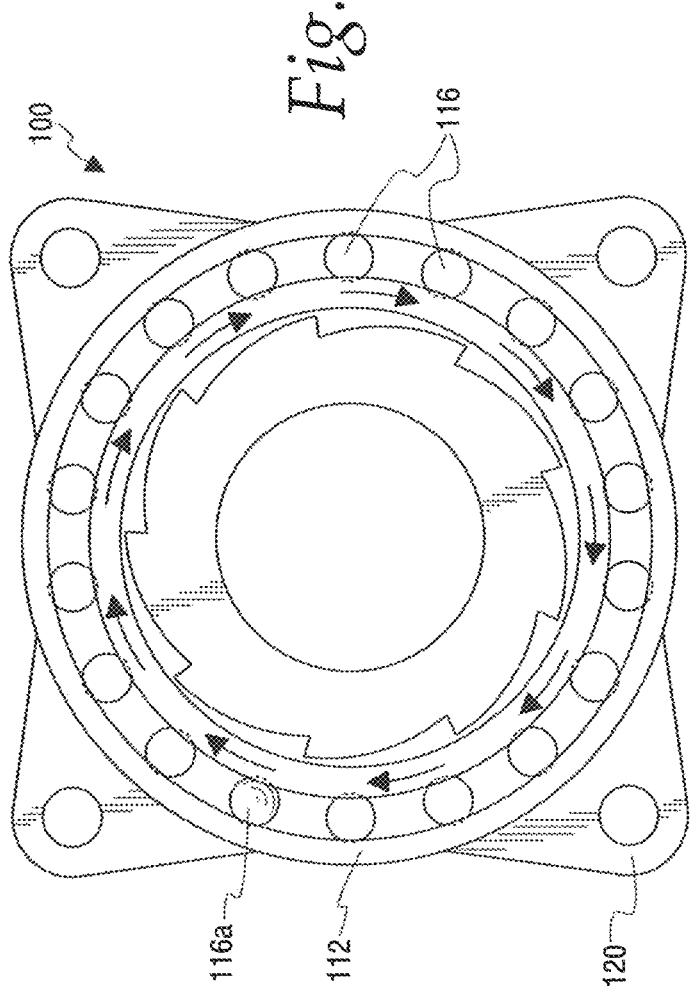

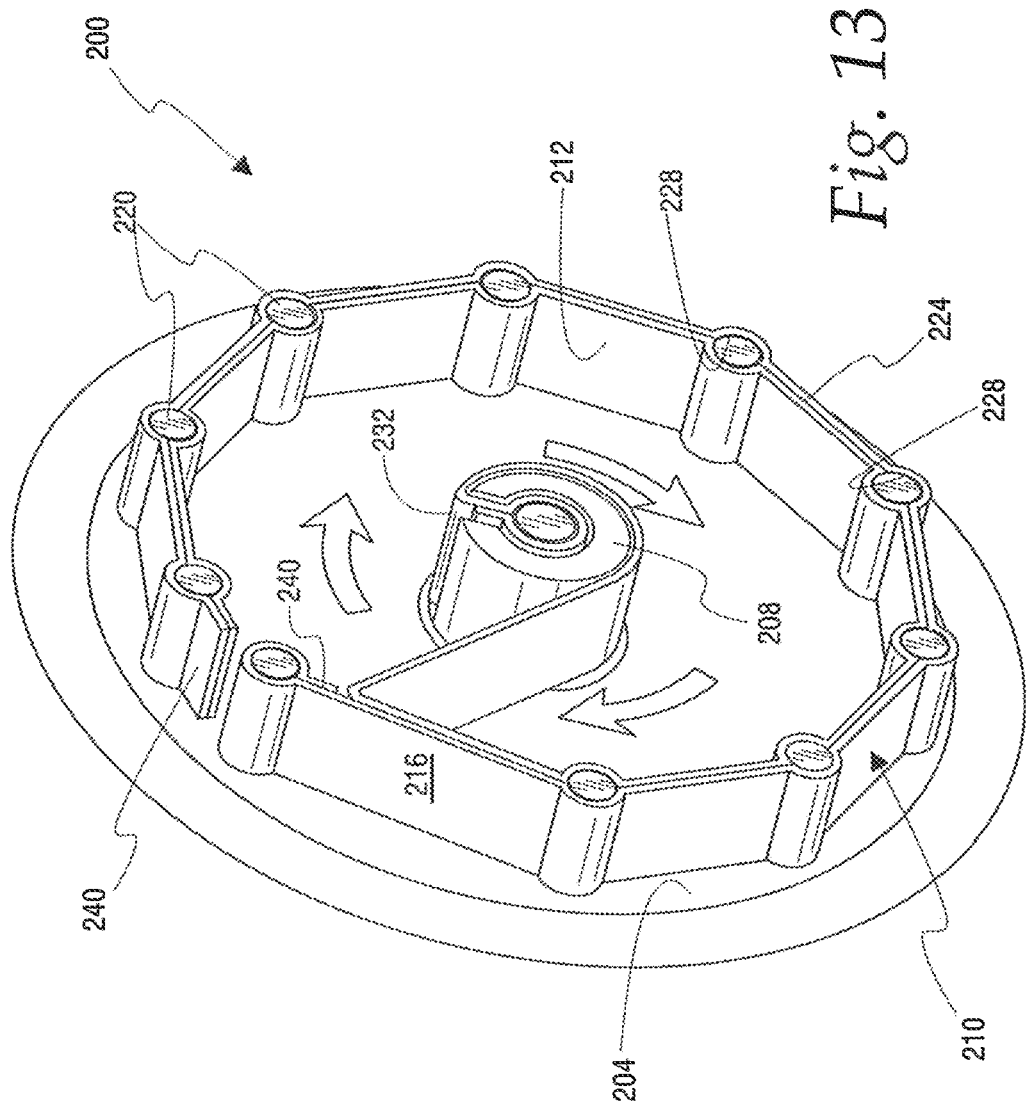

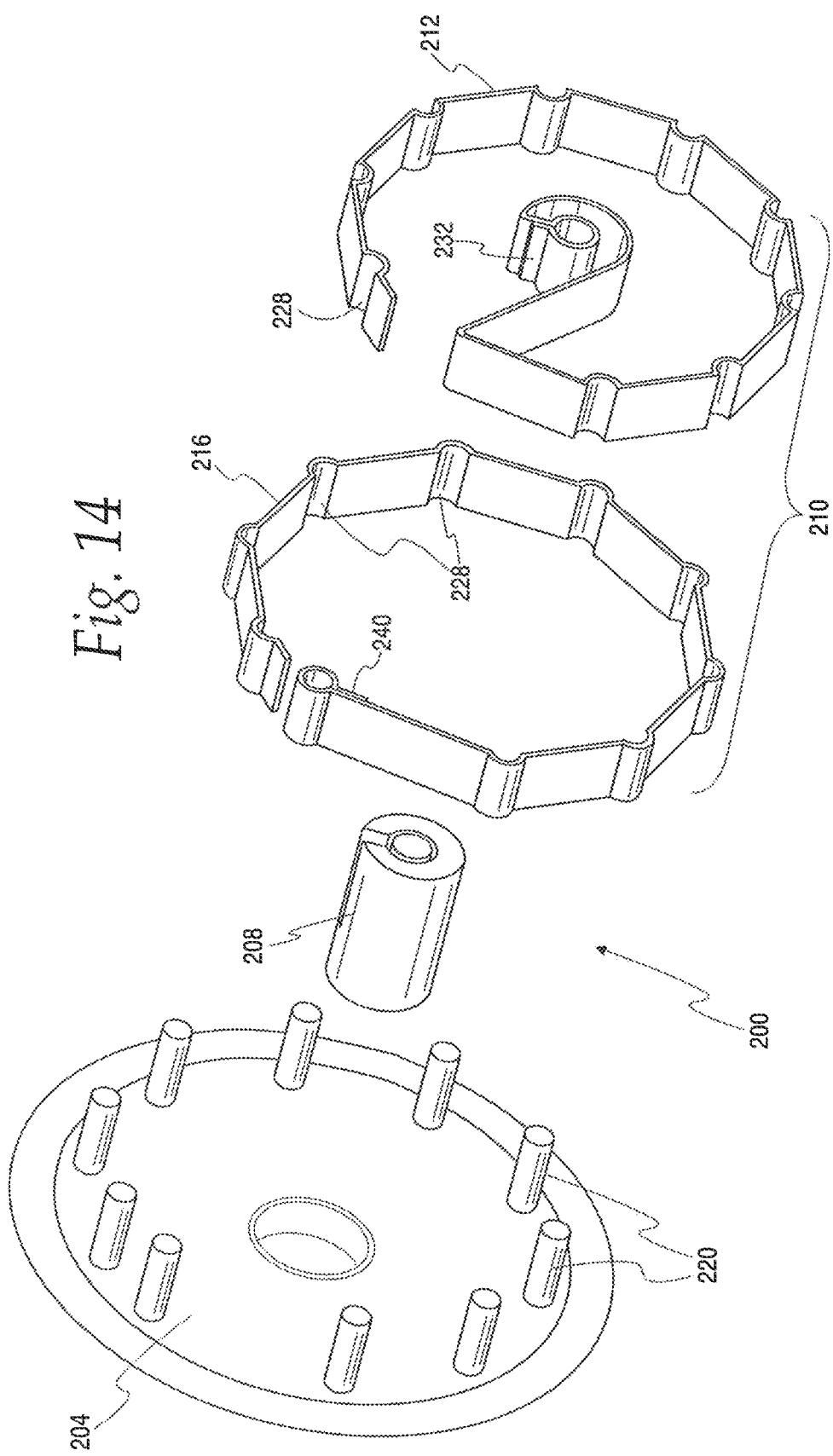

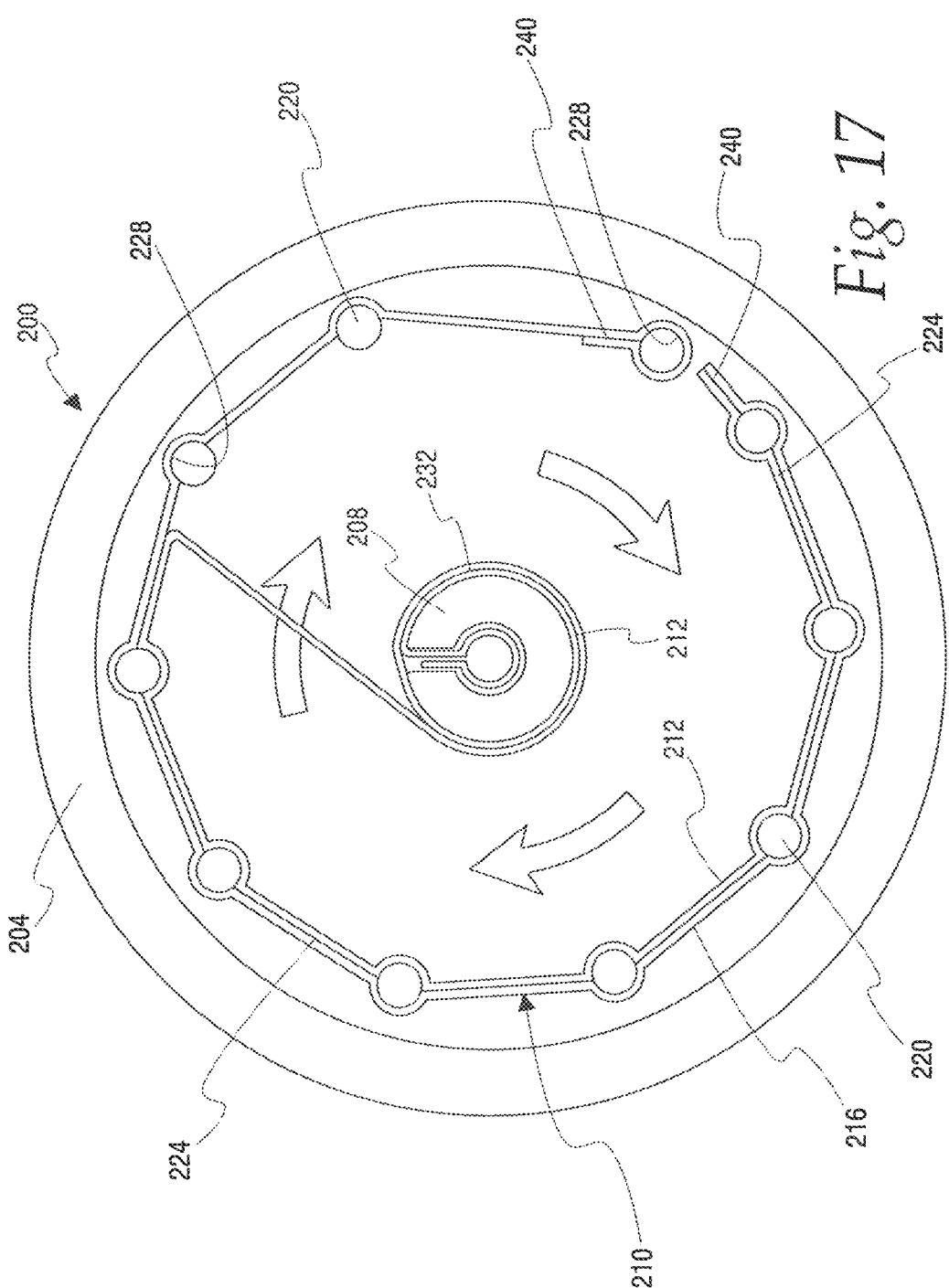

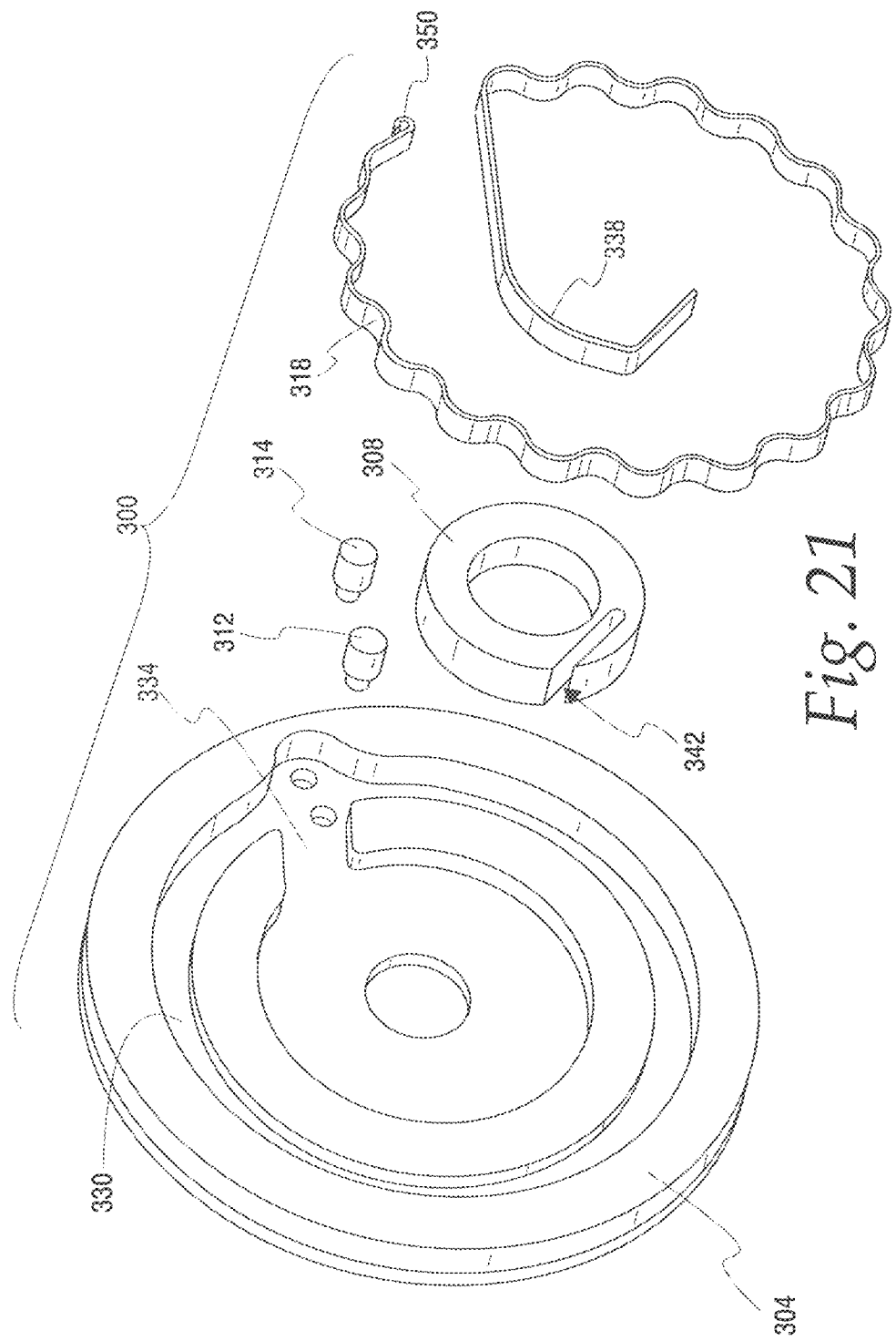

FALL ENERGY LIMITER

CROSS-REFERENCE TO RELATED APPLICATIONS

This application claims priority of Provisional Ser. No. 62/579,714, filed Oct. 31, 2017, the disclosure of which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD

This disclosure relates to retractable-type fall arresters typically referred to as "self-retracting lifelines (SRL's)", and in particular, to fall energy limiters in the form of rotary energy/shock absorbers that are utilized with such SRL's to absorb sufficient energy from a user's fall to prevent user injury during the fall.

BACKGROUND

Self-retracting lifelines typically must incorporate a shock absorber to prevent user injury during a fall. While there are many suitable forms of shock absorbers currently available on the market today, there continues to be a desire for improvements, particularly in the areas of cost, reliability, serviceability, stability of performance, ease of manufacture and assembly, and protection from environmental impacts.

SUMMARY

In accordance with one feature of this disclosure, a rotary energy absorber unit is provided for use in a self-retracting lifeline, the self-retracting lifeline including a housing, a drum mounted for rotation in the housing, and a lifeline wrapped around the drum and extending from the housing. The rotary energy absorber unit includes first and second mount plates mounted in the housing for selective rotation. An energy absorber is mounted between the mount plates to absorb energy in response to the mount plates rotating relative to each other. The energy absorber includes at least one:

(a) a strip of separable webbing having at least two layers of webbing joined to each other by separable connections, the layers mounted to the mount plates so that the layers are pulled apart in response to the mount plates rotating relative to each other, with one of the layers being wrapped around a portion of one of the mount plates as the mount plates rotate relative to each other;

(b) a bite and a strip of metal having a plurality of undulations formed therein, the strip mounted to the mount plates to be drawn through the bite and wrapped around a portion of one of the mount plates in response to the mount plates rotating relative to each other; and (c) a plurality of balls, a plurality of circumferentially spaced ball detents joined by an annular ball track in one of the mount plates, and a plurality of ball receiving openings in the other of the mount plates, with each of the ball receiving openings receiving one of the balls, and a preload device preloading each of the balls into a corresponding one of the ball detents.

Other features and advantages will become apparent from a review of the entire specification, including the appended sheets and drawings.

BRIEF DESCRIPTION OF THE DRAWINGS

FIGS. 3-12 show a first embodiment of an SRL energy absorber, where:
FIG. 3 is a perspective view,
FIG. 4 is an exploded view,
FIG. 5 is a side cross-sectional view showing the energy absorber in one position;
FIG. 6 is a side cross-sectional view showing the energy absorber in a second position;
FIGS. 7-12 show the energy absorber in successive positions, where:
FIGS. 7-8 show the energy absorber in a first position, FIG. 7 being a side cross-sectional view and FIG. 8 being a top view with the spring and pressure plate removed,
FIGS. 9-10 show the energy absorber in a second position, FIG. 9 being a side cross-sectional view and FIG. 10 being a top view with the spring and pressure plate removed, and
FIGS. 11-12 show the energy absorber in a third position, FIG. 11 being a side cross-sectional view and FIG. 12 being a top view with the spring and pressure plate removed;
FIGS. 13-18 show a second embodiment of an SRL energy absorber, where:
FIG. 13 is a perspective view,
FIG. 14 is an exploded view,
FIG. 15 is a perspective view of the textile absorber of the second embodiment,
FIGS. 16-18 are front views of the second embodiment in successive positions, where:
FIG. 16 is a front view of the second embodiment in an initial position,
FIG. 17 is a front view of the second embodiment in a partially deployed position, and
FIG. 18 is a front view of the second embodiment when fully deployed;
FIGS. 19-24 show a third embodiment of an SRL energy absorber, where:
FIG. 19 is a perspective view,
FIG. 20 is a perspective view of the wave metal spring, guide rollers and central plate of the energy absorber,
FIG. 21 is an exploded view,
FIG. 22 is a front view of the energy absorber in an initial position,
FIG. 23 is a front view of the energy absorber after partial deployment of a lifeline, and
FIG. 24 is a front view of the energy absorber in a position of maximum deployment of a lifeline.

DETAILED DESCRIPTION

Various embodiments of rotary energy absorber units for use in a self-retracting lifeline ("SRL's") are shown and described in detail in the attached sheets. Typically, SRL's will include a number of basic components, including a housing, a drum mounted for rotation in a housing, a lifeline wrapped around the drum and extending from the housing so it can be deployed from and retracted back into the housing, a retraction device operably engaged with the drum to automatically rotate the drum in a retraction direction in response to the lifeline being deployed from the housing, and a ratchet mechanism operably engaged with the drum to be activated in response to rotational acceleration caused by rapid deployment of the lifeline during a user's fall. These basic components of SRL's are well known, and there are many suitable types for each of the above-described components, with some examples being shown in Publication No. US 2016/0096048 A1 published Apr. 7, 2016, and in U.S. Pat. No. 5,186,289 issued Feb. 16, 1993, the entire disclosures of which, including all of the figures, are incorporated herein by reference.

Figure 2:
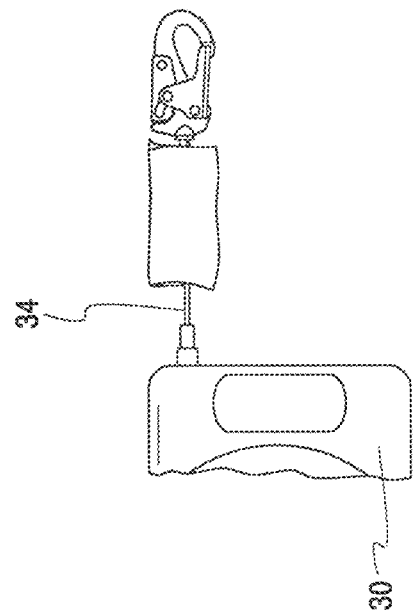
FIGS. 1 and 2 are illustrations of a self-retracting lifeline (SRL) such as may incorporate the herein described energy absorbers.
Figure 1:
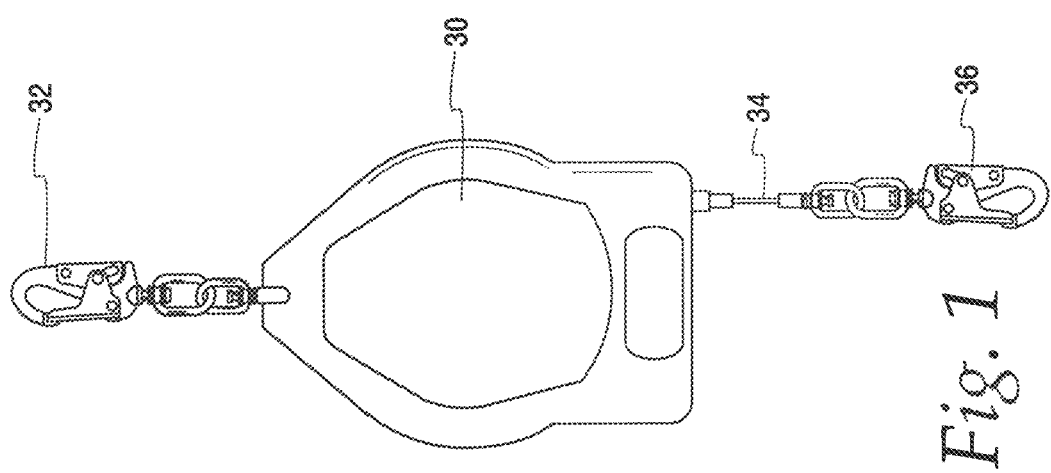
Figure 4:
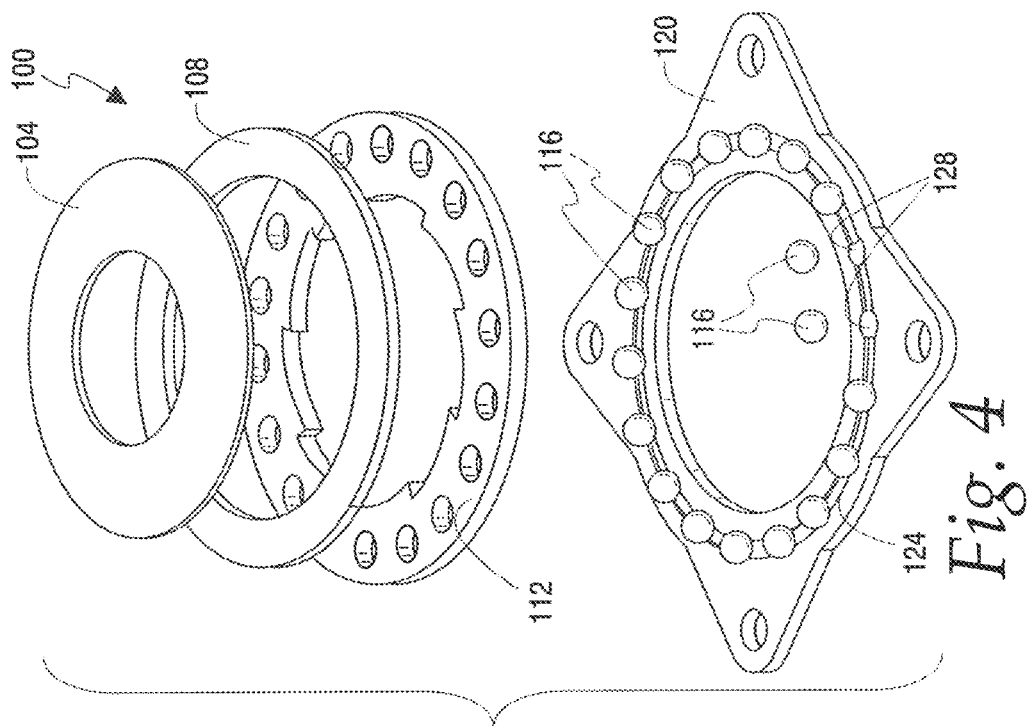

The specific details of these components are not critical to an understanding of the rotatable energy absorber units shown and described herein and each of the rotatable energy absorber units shown and described herein are compatible with all of the known suitable forms of the basic components of conventional SRL's. Accordingly, this disclosure will not provide additional details with respect to the basic components of conventional SRL's, although FIGS. 1-2 are provided for illustration purposes, including a housing 30 including a connector 32 suitable for releasably anchoring the device, with the lifeline 34 and its connector 36 extending from the housing 30 from which it may be deployed from the housing and retracted back into the housing as previously mentioned. The shape of the housing may be adapted to conform with the internal components as described further below.

In the event that a user connected to the lifeline 34 suffers a fall, the lifeline 34 will initially quickly deploy from the housing 30 as it is pulled down with the falling user. In accordance with the present invention, an energy absorber within the housing 30 will arrest the fall by slowing the deployment of the lifeline 34, thereby reducing any dangerous deceleration which could occur if the user is still falling when the lifeline 34 reaches the limit of its deployment.

Three different energy absorbers adapted to working with lifelines which deploy by unspooling from a drum during a fall are disclosed herein.

A first energy absorber 100 is illustrated in FIGS. 3-12.

Figure 3:
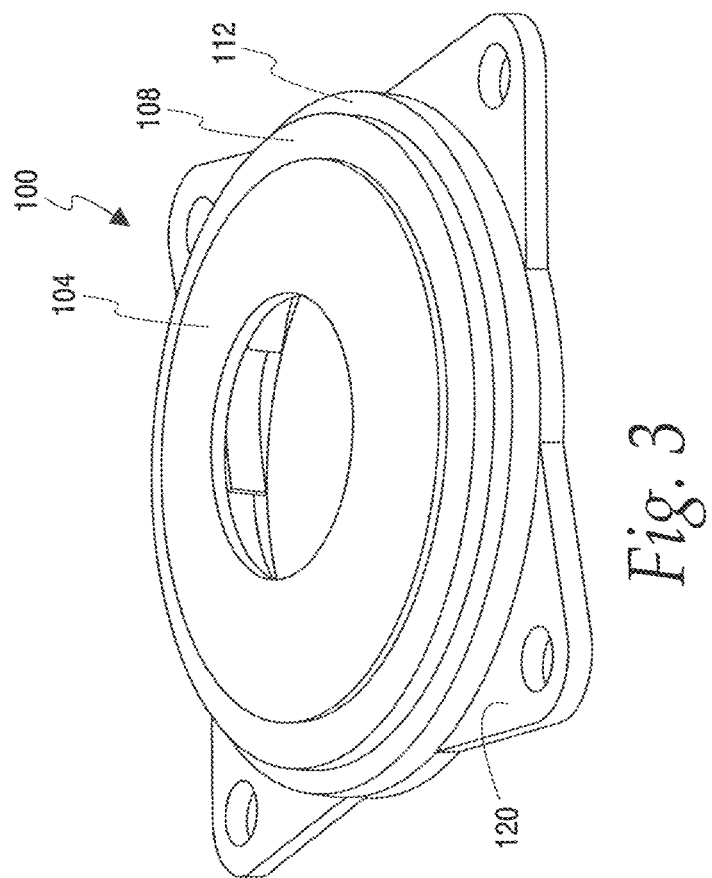

Specifically, as shown in FIG. 3, the first energy absorber 100 comprises a spring 104, a pressure plate 108, a ratchet ring 112, hardened balls 116, and a detent plate 120.

The detent plate 120 is fixed to the housing (e.g., 30) so that it is fixed relative to (i.e., does not rotate relative to) the housing. The detent plate 120 further includes an annular groove 124 with detents 128 spaced around the groove 124.

The ratchet ring 112 includes a plurality of cylindrical openings 128 therethrough, with the hardened balls 116 located in the cylindrical openings 128. Advantageously, there may be an equal number N of cylindrical openings 128, balls 116 and detents 128 spaces equally around the annular groove 124. For example, as illustrated in the figures, N is eighteen (18) (i.e., there are eighteen balls 116, eighteen cylindrical openings 128, and eighteen detents 128), all at twenty degree spacing.

Figure 5:
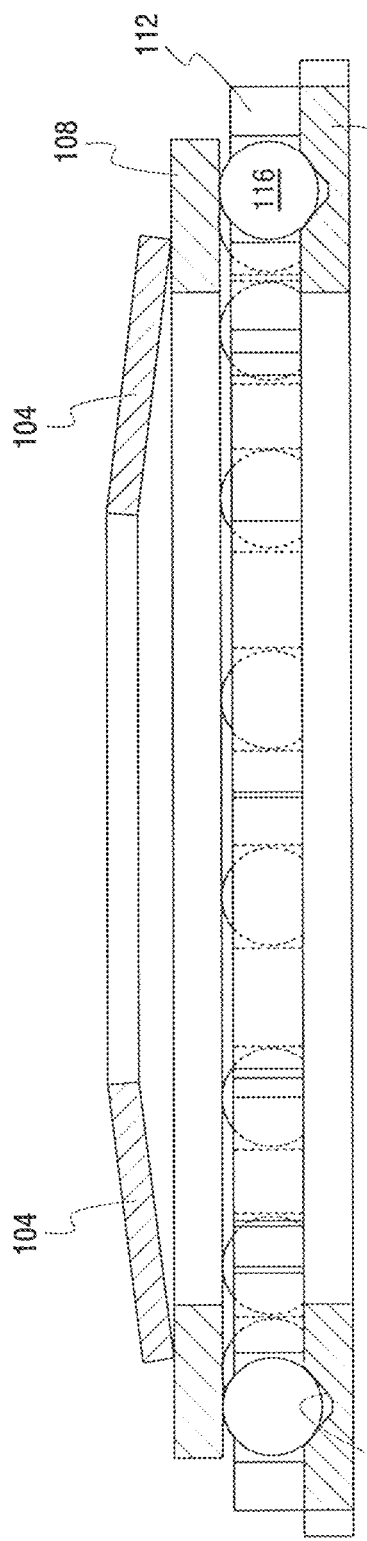
Figure 6:
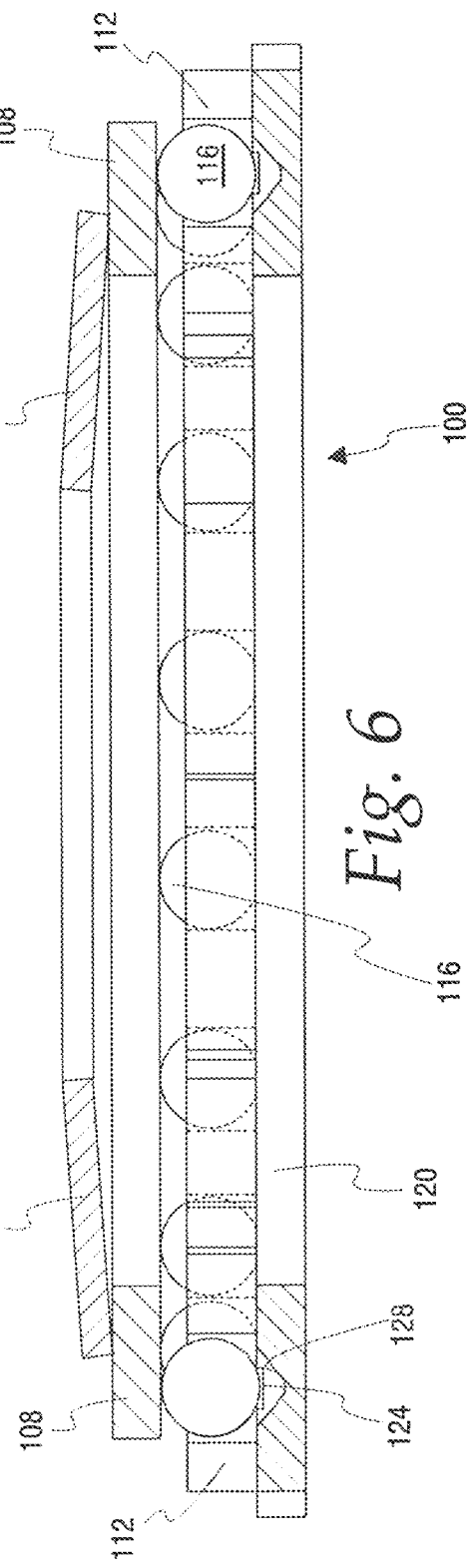
Figure 16:
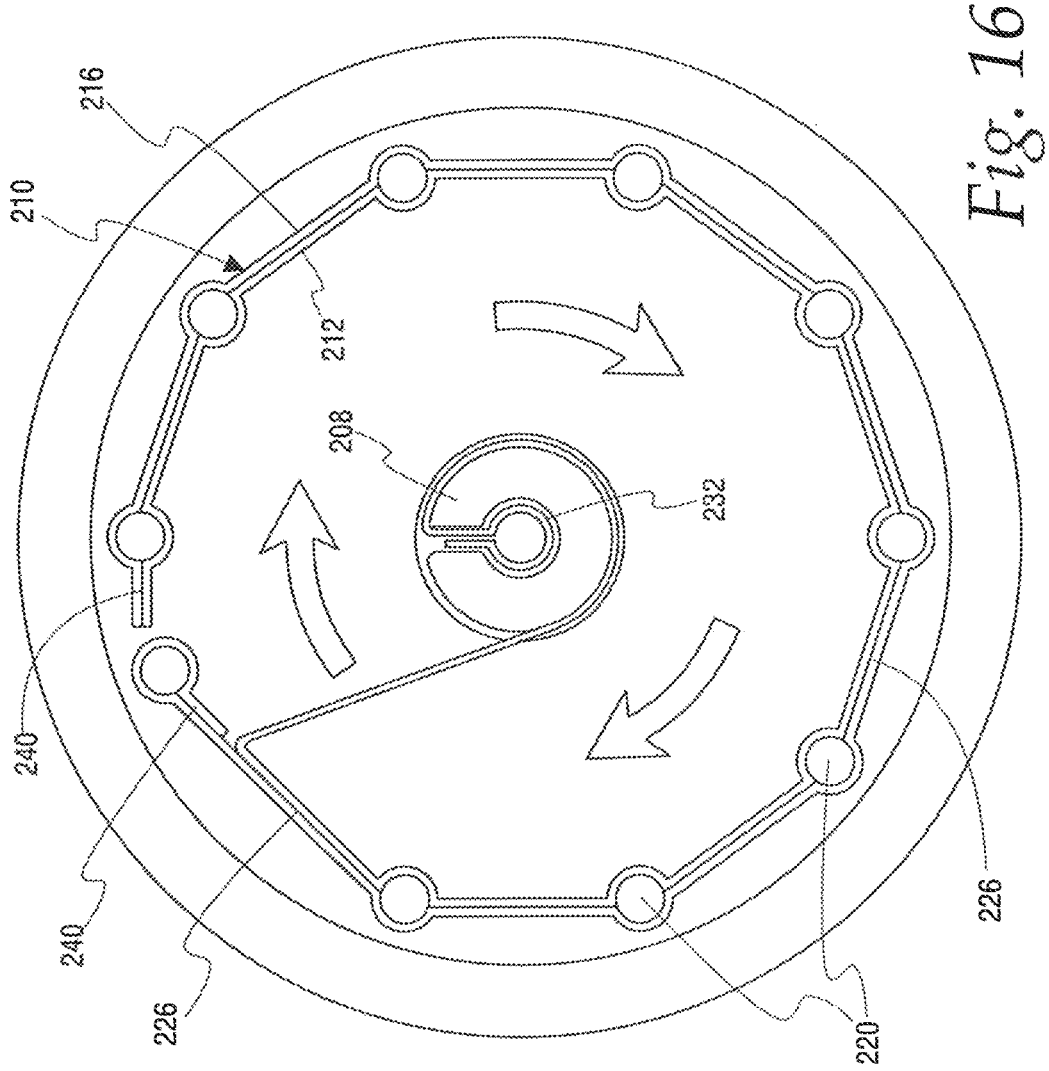
Figure 15:
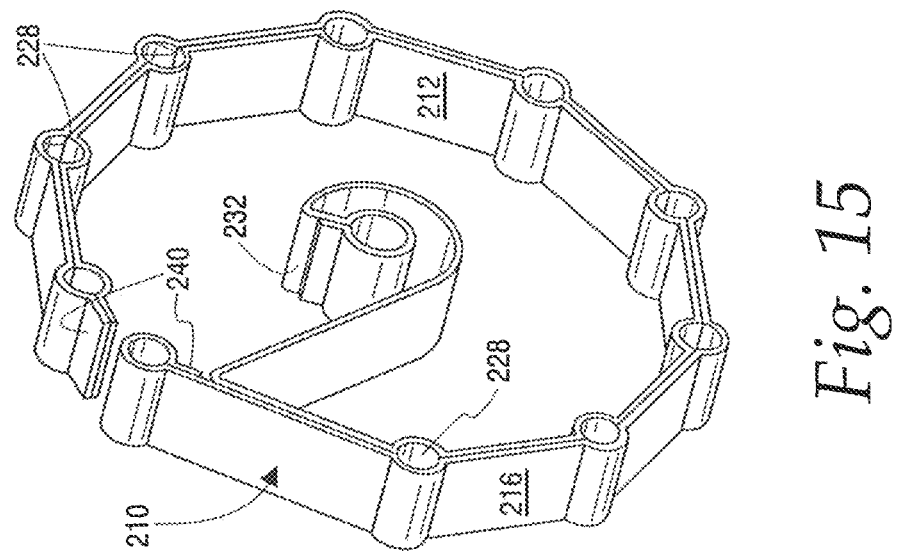
Figure 18:
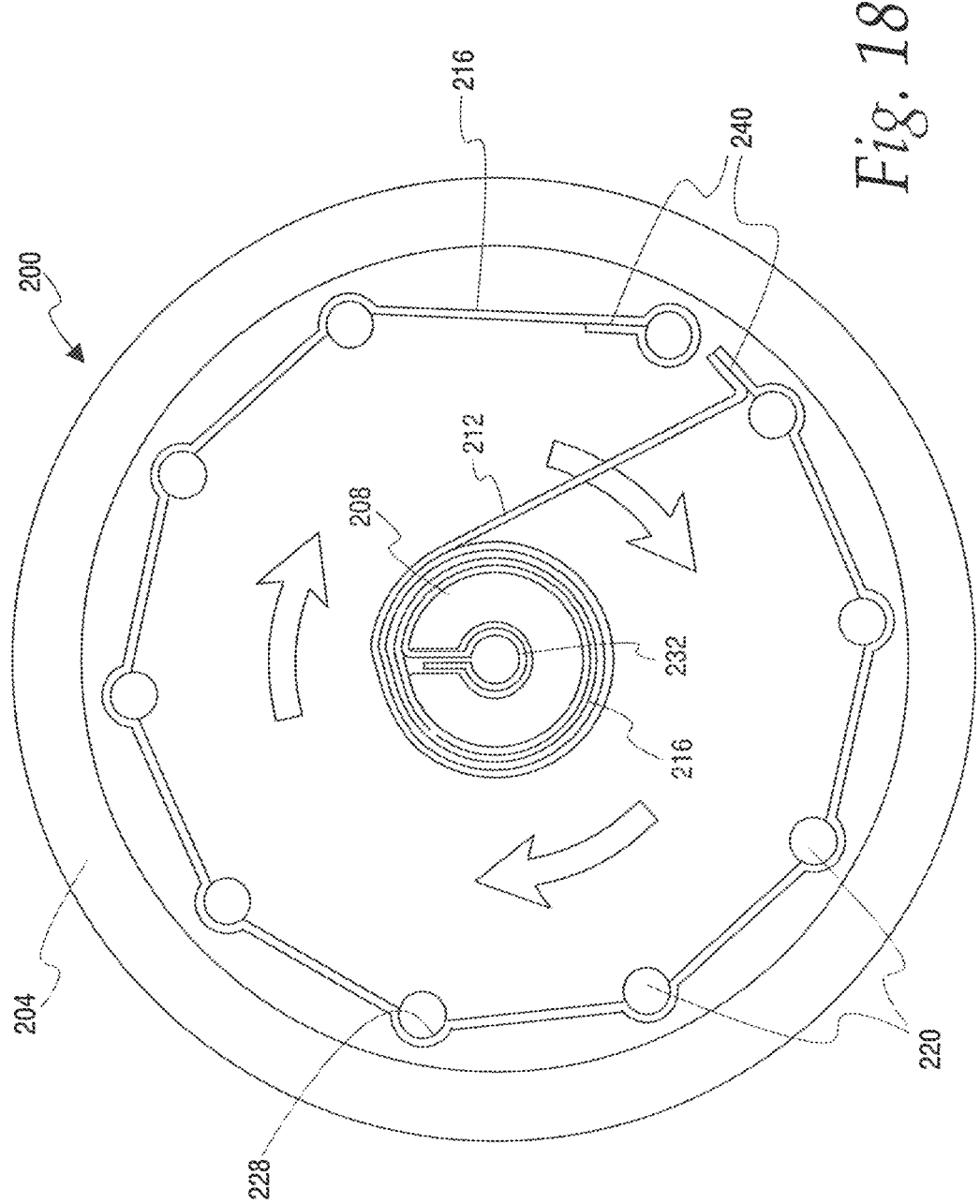
Figure 20:
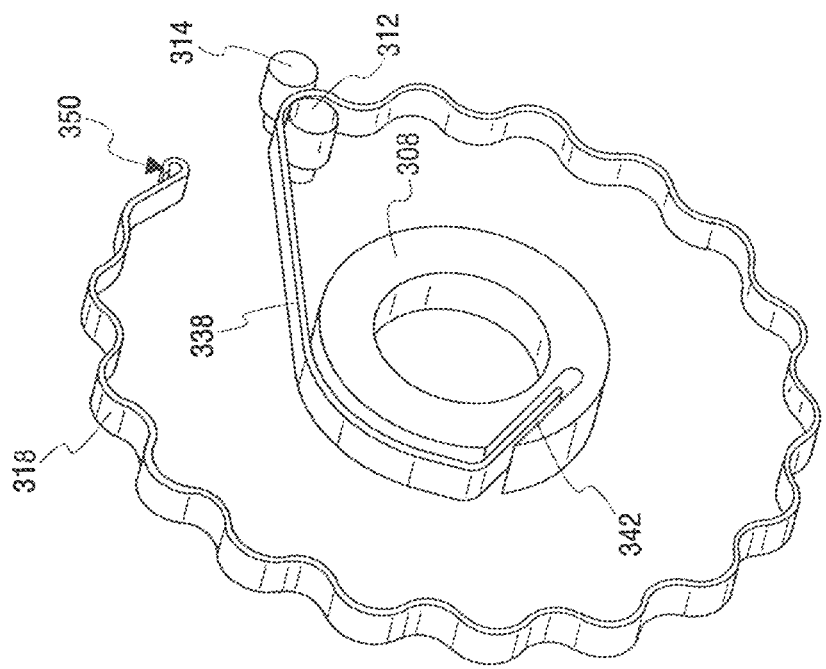

When the balls 116 and detents 128 are aligned, the spring 104 biases the pressure plate 108 against the balls 116 so that they are biased toward the underlying annular groove 124 and into the detents 128 (see FIG. 5). Thus, when the lifeline 34 is deployed from the housing 30, as during a fall, if the torque on the drum or the like around which the lifeline 34 is wrapped is sufficient to overcome the biasing force of the pre-loaded spring 104, the rachet ring 112 will rotate and cause the balls 124 to roll up out of the detents 128 against the force of the spring 104, into the groove 124 (see FIG. 6).

That is, as shown in FIGS. 7-12, from one position (FIGS. 7-8) in which ball 116a is in detent 128a (hidden beneath ball 116a in FIG. 8), the ball 116a will be rolled out of the detent 128a and into the groove 124 (FIGS. 9-10). As rotation continues, the ball 116a will roll into the next detent 128b (FIGS. 11-12). As this occurs repeatedly (e.g., eighteen times, for all of the balls 116 per three hundred and sixty [360] degree rotation of the illustrated ratchet ring 112 having eighteen balls 116), the energy of the falling user causing the lifeline 34 to deploy will be absorbed, thereby gradually slowing the deployment until the energy of the fall is insufficient to overcome the spring pre-load holding the balls 116 in the detents 128.

The illustrated energy absorber 100 is based upon known ball detent torque limiters such as are used in hand operated drills/drivers and other devices to protect against damage caused by overtorquing, but which are not known for use as energy absorbers in fall protection equipment, let alone in SRL's.

It should be appreciated that while the illustrated embodiment of the rotating ball detent shock absorber will be desirable in many applications, this disclosure contemplates other embodiments and modifications. For example, while the illustrated embodiment shows a spring 104 in the form of a conical spring washer, other suitable types of springs can be utilized to preload the steel balls against the detent plate. By way of further example, while a detent plate 120 is disclosed and described as being fixed to the main housing in the SRL, the detent plate could be operably connected to the drum of the SRL, such as via a ratchet mechanism, for rotation with the drum during a fall. In this regard, the ratchet features of the disclosed ratchet ring would be eliminated, with the ratchet ring being fixed to the SRL housing and the ratchet features of the ratchet ring being added to the detent plate. By way of further example, while the illustrated embodiment shows a certain number of steel balls, in some applications more or fewer steel balls may be desired. As yet a further example, while FIGS. 3-12 illustrate a specific "ramped" profile for the ball detents, other suitable shapes and profiles may be utilized for the ball detents. By way of further example, while the ratchet ring 112 is shown as having the ratchet features on the interior perimeter of the ratchet ring, the ratchet features could be provided on the exterior perimeter of the ratchet. Furthermore, the exterior of the ratchet ring can have other shapes than circular. Similarly, while the illustrated embodiment of the detent plate shows a somewhat rectangular perimeter, other shapes are possible, including other shapes with more or fewer mount holes than the four mount holes shown in the illustrated embodiment. Accordingly, it should be understood that no limitations to a specific shape, form or configuration are intended unless expressly in an appended claim. It should further be appreciated that the amount of energy absorbed/dissipated by the rotating ball detent energy absorber 100 will depend upon a number of factors, including the spring pre-load, the number of steel balls, the surface finishes of all the mating components, the shape of the ball detents, and the specific material selected for each of the components. It is within the grasp of those skilled in the art to adjust each of the above-described factors in order to achieve a desired torque at which the ball detent energy absorber will become active, and to further determine the amount of energy that will be absorbed/dissipated by the ball detent shock absorber for each movement of the steel balls from one detent to an adjacent detent.

A second energy absorber 200 is illustrated in FIGS. 13-18.

Specifically, as particularly shown in FIGS. 13-14, the second energy absorber 200 comprises an absorber housing plate 204, a shock absorber anchor plate 208, and a two part textile absorber 210 with inner and outer webbings 212, 216.

The absorber housing plate 204 is fixed to or part of the drum around which the lifeline 34 is wrapped and rotates in the direction of the arrows when a lifeline is deployed from the housing 30. Mount posts 220 are spaced around the housing plate 204 to carry the textile absorber 210 with the absorber housing plate 204 as it rotates as detailed further below. The anchor plate 208 is fixed relative to the housing 30 so that the housing plate 204 rotates about the anchor plate 208.

The textile absorber 210 has the inner and outer webbings 212 secured together by sewn seams 224 with gaps 228 in the seams whereby the textile absorber 210 is secured to the posts 220 circumferentially around the absorber housing plate 204.

An inner end of the inner webbing 212 is suitably configured so as to be fixed to the anchor plate 208 so that when the absorber housing plate 204 rotates relative to the anchor plate 208 (as during a fall by a user causing the lifeline 34 to deploy), the inner end 232 of the inner webbing 212 will not rotate relative to the anchor plate 208 and thus the inner webbing 212 will be drawn radially inwardly to wrap around the anchor plate 208. As the inner webbing 212 is pulled inwardly in this manner, the seam between the inner webbing 212 and outer webbing 216 will thus be caused to rip apart and absorb energy from the fall (see the ripped seams in FIG. 17 relative to initially unripped seams in FIGS. 13 and 16).

The seam 228 between the webbings 212, 216 may be any suitable seam which may be designed to rupture under a predetermined load such as may be expected from a fall by a user. Rotation will stop when the fall force is no longer sufficient to generate enough force to continue breaking the separable seams 228. An end seam 240 is a permanent seam sufficiently strong to hold maximal loads, so that should the inner webbing 212 fully tear the seams 228, the absorber housing plate 204 and attached drum will be stopped from continued rotation, thereby stopping deployment of the lifeline 34 (see FIG. 18).

The energy absorber 200 should thus be understood to be a rotary textile absorber which includes a shock absorbing textile strap that is formed from two layers of webbing joined by separable lines or seams of stitching. While textile shock absorbers utilizing such a two-layer construction are known, use in a rotary construction such as is shown in the illustrated embodiment is new and not obvious.

It is also within the skill of the person in the art to create a textile shock absorber such as shown in the illustrated embodiment with a predetermined initiating load/torque that is required to initiate separation of the separable seams/stitching, and to furthermore design the textile shock absorber to absorb a predetermined amount of energy by proper selection of the webbing materials, the stitching material, and the type of stitches utilized.

It should be understood that while the illustrated embodiment of the rotary textile absorber will be desirable in many applications, this disclosure contemplates other embodiments and modifications for the rotary textile absorber. For example, while the absorber housing plate 204 is described as fixed to the drum of the lifeline 34 and the shock absorber anchor plate 208 as being locked against rotation via a ratchet mechanism, in some embodiments it may be desirable for the absorber housing plate to be locked via a ratchet mechanism while the shock absorber anchor plate is fixed to the drum of the lifeline. By way of further example, while the absorber housing plate 204 is shown as having a plurality of circumferentially spaced cylindrical posts 220 that are received within cylindrical-shaped openings in the textile absorber 210, other shapes for both the posts on the absorber housing and the openings in the textile absorber may be desirable depending upon the specifics of the application. Furthermore, it may be desirable for the textile absorber to be attached to the absorber housing plate via structure other than cantilevered posts. By way of further example, while the shock absorber anchor plate is disclosed as having a cylindrical outer surface, other shapes for the outer surface may be desirable in some applications. As yet another example, while the absorber housing plate is shown as having a circular outer perimeter, other shapes for the outer perimeter of the absorber housing plate may be desirable. As yet another example, while the illustrated embodiment shows ten of the cantilevered posts extending from the absorber housing plate, in some applications more or fewer of the cantilevered posts may be desirable. Furthermore, while the illustrated embodiment of the textile shock absorber 210 utilizes separable seams to absorb energy, other types of separable bonding may be desirable depending upon the specifics of the application. Accordingly, it should be understood that no limitations to a specific form or configuration are intended unless expressly recited in an appended claim.

A third energy absorber 300 is illustrated in FIGS. 19-24.

Figure 19:
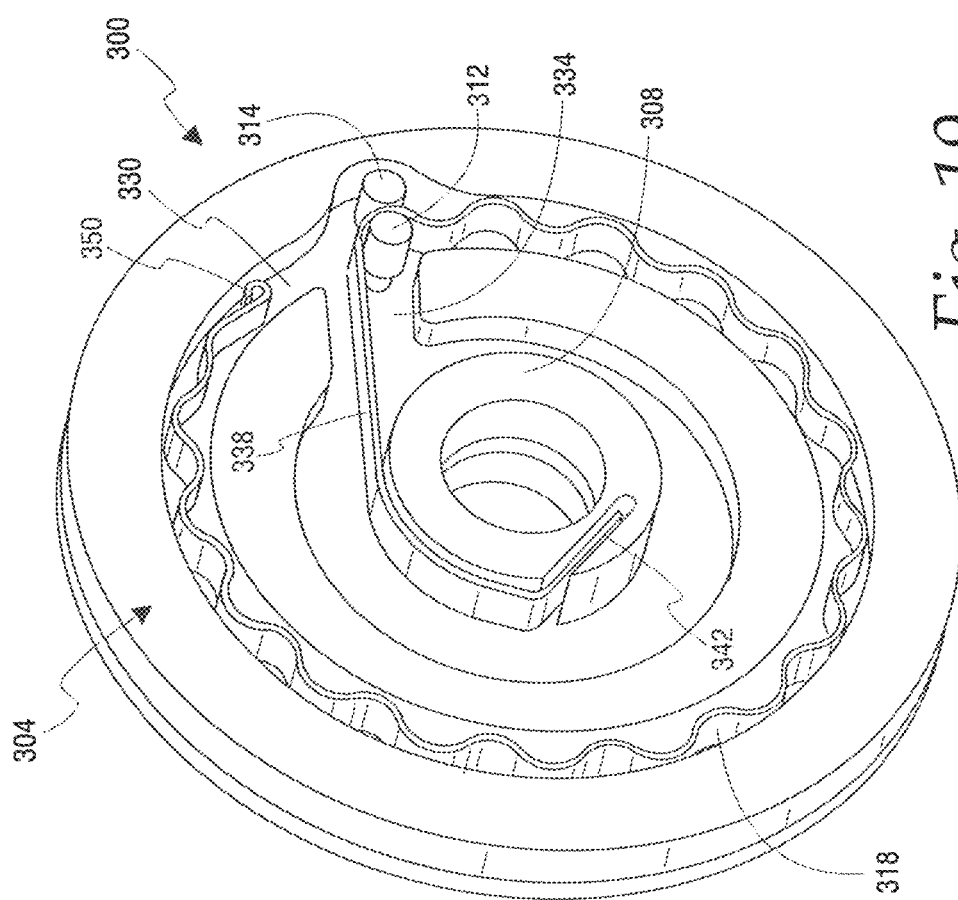
Figure 22:
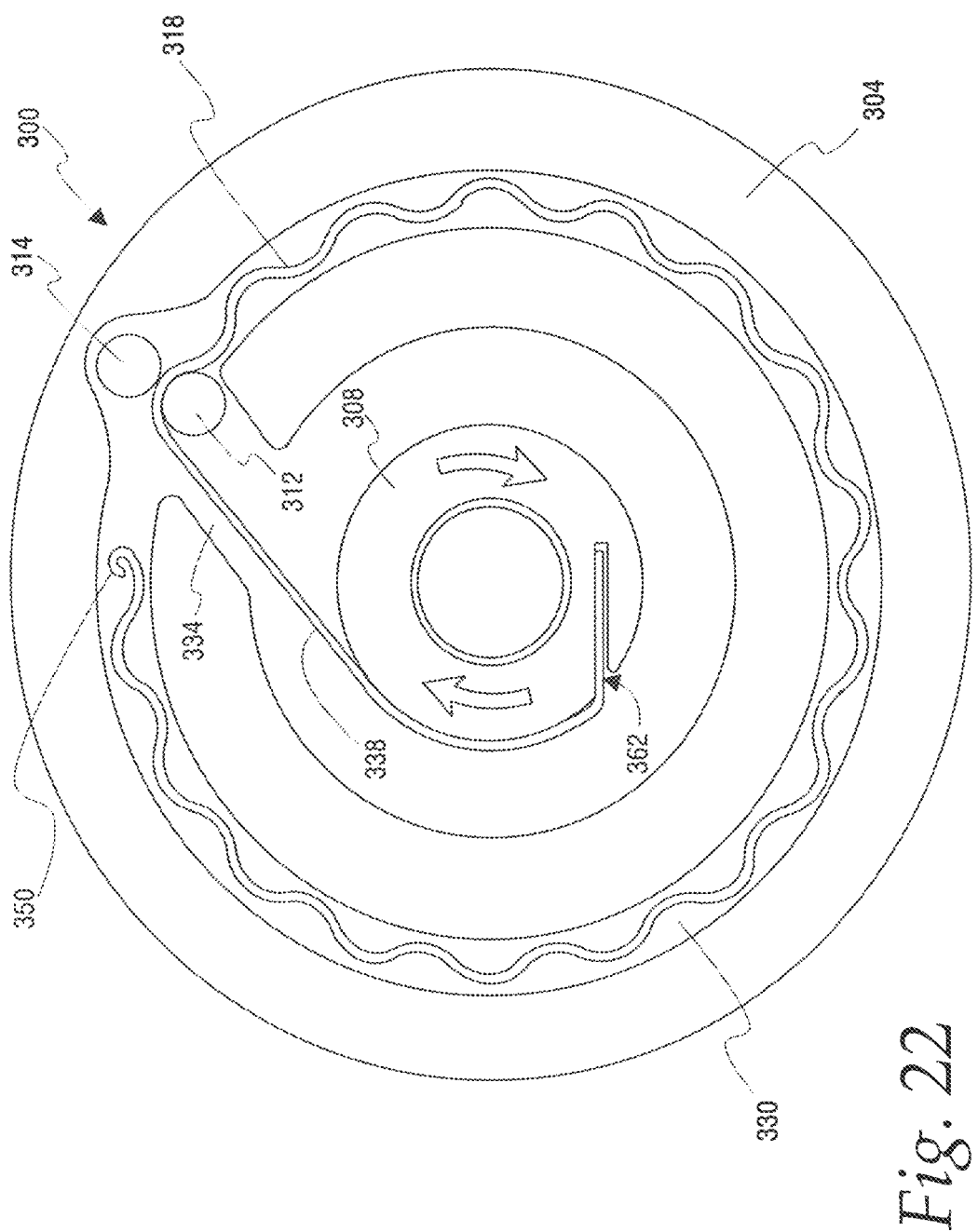
Figure 23:
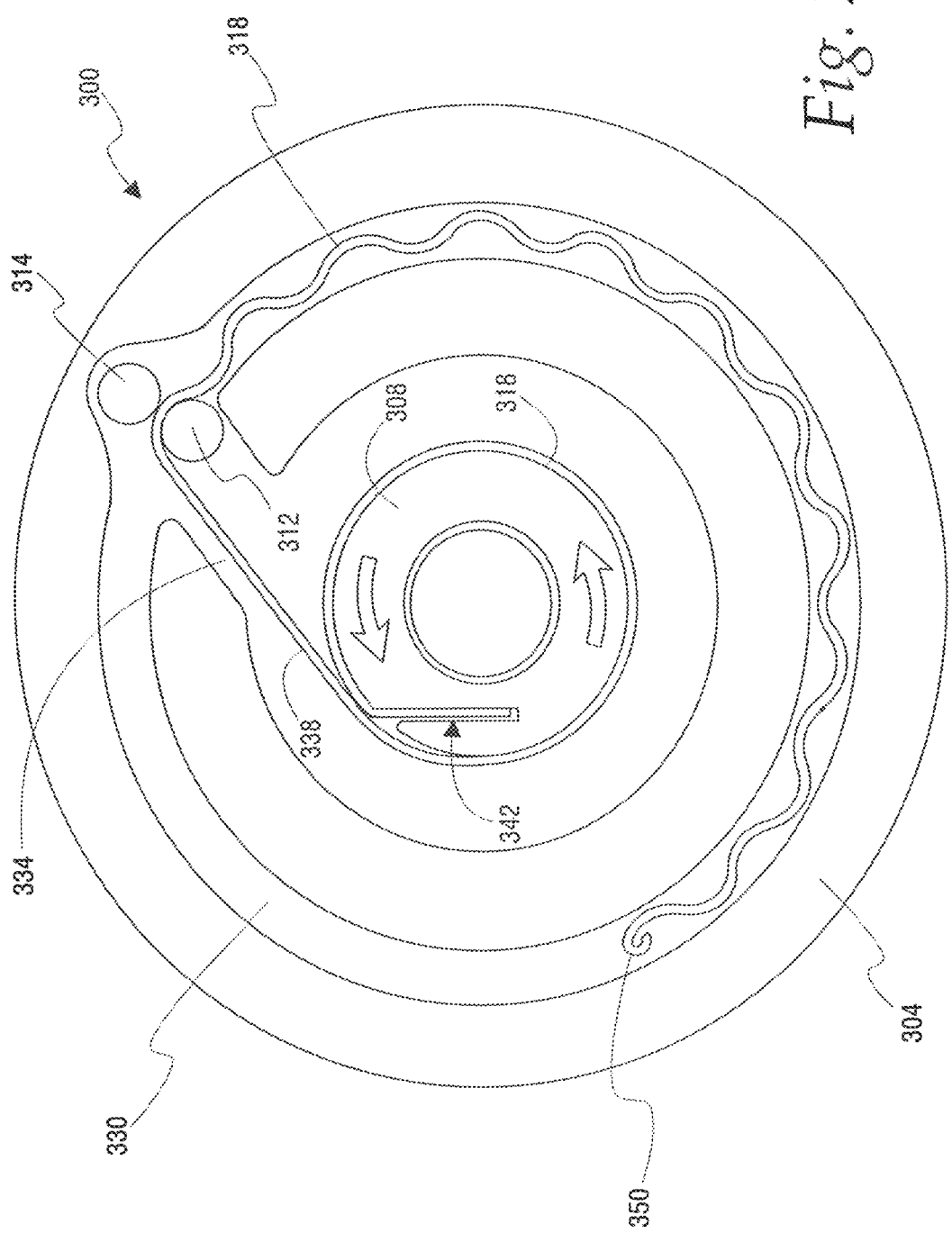
Figure 24:
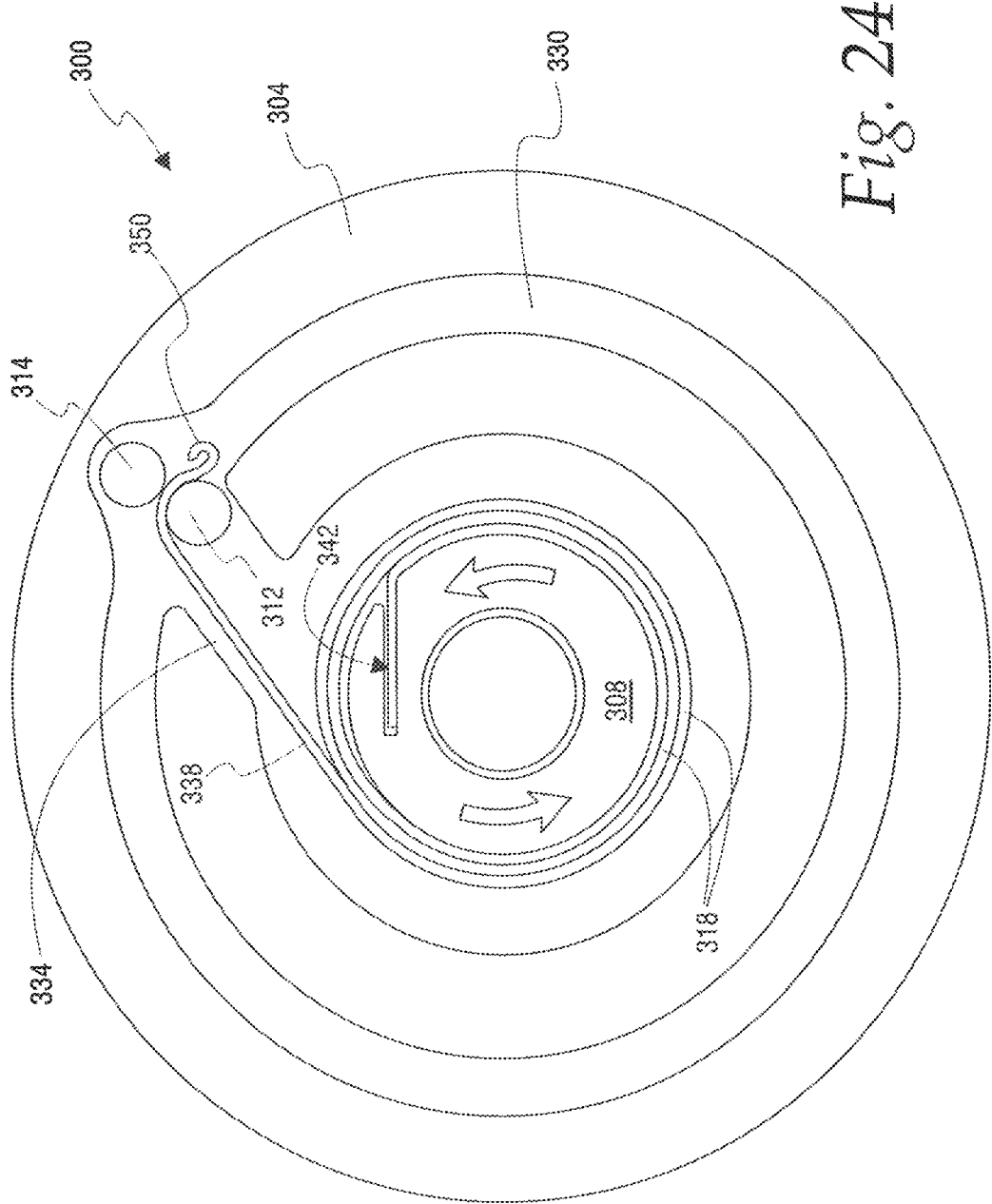

Specifically, as particularly shown in FIGS. 19 and 21, the third energy absorber 300 comprises a body plate 304, a central plate or spool 308, guide rollers 312, 314, and a wave metal strap 318.

The body plate 304 is suitably secured against rotation relative to the housing, and defines an annular groove 330. The guide rollers 312, 314 are secured in the body plate groove 330 adjacent a generally radial groove 334.

The central plate 308 is axially aligned with the body plate groove 330 and is suitably secured to the lifeline 34 to rotate relative to the body plate 304 in response to deployment of the lifeline 34 (e.g., when a user falls).

The wave metal strap 318 is in the body plate annular groove 330 and includes a forward end 338 which passes between the guide rollers 312, 314 and extends through the generally radial groove 334 to a suitable securement (at 342) to the central plate 308. The wave metal strap 318 passes between the guide rollers 312, 314 and bends around the inner guide roller 312 toward the radial groove 334 when the central plate 308 rotates responsive to deployment of the lifeline 34 (e.g., when a user falls), such rotation pulling the metal strap 318 to wrap around the central plate 308. When this occurs, it should be appreciated that the wave metal strap 318 will not only bend around the inner roller guide 312 but its waves will also be straightened out, all of which will absorb energy. The rear end 350 of the wave metal strap 318 may include a crimp or other suitable structure which will prevent the metal strap rear end 350 from passing through the space between the guide rollers 312, 314, thereby providing a limit of the rotation of the central plate 308.

The forces required to deform a strip or strap of metal and the energy required to deform a strap of metal are determinable by those skilled in the art. Accordingly, those skilled in the art can design the rotary metallic wave shock absorber to have a predetermined torque at which the shock absorber will become active with the body plate 304 of the absorber 300 and the central plate 308 of the absorber rotating relative to each other while deforming the metal strap 318, and to design the rotary metallic wave shock absorber to absorb a predetermined amount of energy.

It should be understood that while the illustrated and described embodiment of the rotary wave metallic shock absorber will be desirable in many applications, this disclosure contemplates other embodiments and modifications. For example, while the body plate of the absorber is illustrated as having an annular channel 330 that receives and mounts the wave metal strap 318, in some embodiments it may be desirable for other structure to be provided to receive and mount the wave metal strap 318. As another example, while the illustrated embodiment shows the bite or pinch being provided by guide rollers 312, 314, in some embodiments it may be desirable for the bite or pinch to be provided by other structure. As yet a further example, while the illustrated embodiment describes the body plate as being connected to the SRL housing, in some embodiments it may be desirable for the body plate to be connected to the drum via a ratchet mechanism, with the central plate being connected to the SRL housing. As yet a further example, while the illustrated embodiment shows a certain number of waves or undulations in the wave metal strap, in some applications it may be desirable for more or less wave or undulations to be provided, and furthermore, for the waves or undulations to have a different geometry than the geometry in the illustrated wave metal strap. As yet another example, while the body plate of the absorber is illustrated as having a centrally located recess for receiving the central plate and the wave metal strap 318 as it is deformed/wrapped onto the central plate 308, in some embodiments it may be desirable for this structure to either be eliminated or provided in another form. Similarly, while the central plate 308 is shown as having a cylindrical outer surface, in some embodiments it may be desirable for the outer surface to be provided with a different geometric shape. Furthermore, while the outer perimeter of the body plate 304 is shown as being cylindrical, in some embodiments it may be desirable for the outer perimeter of the body plate to have a different geometric shape. Accordingly, it should be understood that no limitations to a specific form or configuration are intended unless expressly recited in an appended claim.

The following is one example of the subject matter that may be claimed by this disclosure.

The invention claimed is:

1. A self-retracting lifeline device, comprising:
   a housing; and
   a rotary energy absorber unit configured to be operably coupled to a lifeline wrapped about a drum mounted for rotation in the housing, the rotary energy absorber unit including
      a first mount plate adapted for selective rotation in the housing, wherein one side of the first mount plate defines an annular groove with spaced detents,
      a second mount plate disposed adjacent the first mount plate, wherein the first mount plate is secured within said housing and the second mount plate is overlaying the first mount plate;
      an energy absorber disposed between the first mount plate and the second mount plate, the energy absorber being adapted to absorb energy in response to at least one of the first mount plate and the second mount plate rotating relative to the housing, said energy absorber comprising at least one ball, of a plurality of N balls, disposed in at least one opening of at least one detent of the spaced detents such that the energy causing rotation of the at least one of the first mount plate or the second mount plate relative to the housing is dispersed by displacement from the at least one ball from the at least one opening into the at least one detent; and
      a ratchet ring adjacent said first mount plate on the first side and adjacent the second mount plate on the second side, said ratchet ring rotating relative to said first mount plate when said lifeline unwraps from said drum during a fall, and including a plurality N of annularly arranged cylindrical openings having the plurality N of balls, one ball each in said ratchet ring cylindrical opening, therethrough aligned with said first mount plate groove and detents,
      wherein said ratchet ring is disposed between said first mount plate and said second mount plate, said second mount plate being biased toward said first mount plate whereby said plurality of mount balls are biased into said annular groove and spaced detents.

2. The self-retracting lifeline device of claim 1, further comprising a spring biasing said second mount plate toward said first mounting plate, wherein said second mount plate is an annular pressure plate overlying said ratchet ring cylindrical openings to bias said balls toward said annular groove and detents of said first mount plate.

3. The self-retracting lifeline device of claim 1, wherein the rachet ring has a thickness which is less than the diameter of the balls.

4. A self-retracting lifeline device, comprising:
   a rotary energy absorber unit configured to be operably coupled to a lifeline, the rotary energy absorber unit comprising:
      a first mount plate secured within a housing and adapted for selective rotation in the housing, one side of said first mount plate defining an annular groove with spaced detents therein,
      a second mount plate disposed adjacent the first mount plate and overlaying the first mount plate,
      a ratchet ring disposed between said first mount plate and said second mount plate, said ratchet ring configured to rotate relative to said first mount plate when said lifeline unwraps from said drum during a fall, said ratchet ring comprising a plurality of annularly arranged cylindrical openings therethrough aligned with said first mount plate groove and detents, and
      a plurality of balls arranged such that a respective ball of said plurality of balls is aligned with a respective cylindrical opening of said ratchet ring cylindrical openings, wherein said second mount plate is biased toward said first mount plate such that said plurality of balls are biased into said annular groove and spaced detents,
      wherein, in an instance in which the rotary energy absorber unit is operably coupled to a lifeline and a user to whom the lifeline is secured experiences a fall, the rotation of the ratchet ring causes each respective ball in each respective cylindrical opening to advance to a next respective cylindrical opening.

5. The self-retracting lifeline device of claim 4, further comprising:
   a spring biasing said second mount plate toward said first mount plate, wherein said second mount plate is an annular pressure plate overlying said ratchet ring cylindrical openings to bias said balls toward said annular groove and detents of said first mount plate.

6. The self-retracting lifeline device of claim 4, wherein the rachet ring has a thickness which is less than a diameter of the balls.

7. A rotary energy absorber, comprising:
a first mount plate secured within a housing, one side of said first mount plate defining an annular groove with spaced detents therein;
a second mount plate disposed adjacent the first mount plate and overlaying the first mount plate;
a ratchet ring disposed between said first mount plate and said second mount plate, said ratchet ring configured to rotate relative to said first mount plate, said ratchet ring comprising a plurality of annularly arranged cylindrical openings therethrough aligned with said first mount plate groove and detents, and
a plurality of balls arranged such that a respective ball of said plurality of balls is aligned with a respective cylindrical opening of said ratchet ring cylindrical openings, wherein said second mount plate is biased toward said first mount plate such that said plurality of balls are biased into said annular groove and spaced detents,
wherein, in an instance in which the rotary energy absorber is operably coupled to a lifeline and a user to whom the lifeline is secured experiences a fall, the rotation of the ratchet ring causes each respective ball in each respective cylindrical opening to advance to a next respective cylindrical opening.

8. The self-retracting lifeline device of claim 7, further comprising: a spring biasing said second mount plate toward said first mount plate, wherein said second mount plate is an annular pressure plate overlying said ratchet ring cylindrical openings to bias said balls toward said annular groove and detents of said first mount plate.

9. The self-retracting lifeline device of claim 7, wherein the rachet ring has a thickness which is less than a diameter of the balls.

* * * * *